US00RE42445E

(19) United States
(12) Reissued Patent
Felderhoff et al.

(10) Patent Number: US RE42,445 E
(45) Date of Reissued Patent: Jun. 14, 2011

(54) CUTTING STRUCTURE FOR EARTH-BORING BIT TO REDUCE TRACKING

(75) Inventors: Floyd Felderhoff, Montgomery, TX (US); Matthew R. Isbell, Norman, OK (US); Rudolf C. Pessier, The Woodlands, TX (US)

(73) Assignee: Baker Hughes Incorporated, Houston, TX (US)

(21) Appl. No.: 12/794,510

(22) Filed: Jun. 4, 2010

Related U.S. Patent Documents

Reissue of:
(64) Patent No.: 7,647,991
Issued: Jan. 19, 2010
Appl. No.: 11/754,713
Filed: May 29, 2007

U.S. Applications:
(60) Provisional application No. 60/808,874, filed on May 26, 2006.

(51) Int. Cl.
*E21B 10/00* (2006.01)
*E21B 10/16* (2006.01)

(52) U.S. Cl. ..... 175/341; 175/353; 175/376

(58) Field of Classification Search ..... 175/374, 175/353, 376, 341
See application file for complete search history.

(56) References Cited

U.S. PATENT DOCUMENTS

| | | | | |
|---|---|---|---|---|
| 2,533,259 | A | 12/1950 | Woods et al. | |
| 2,774,571 | A * | 12/1956 | Morlan | 175/341 |
| 3,018,835 | A | 1/1962 | Kucera | |
| 3,134,447 | A | 5/1964 | McElya et al. | |
| 3,223,188 | A * | 12/1965 | Coulter, Jr. et al. | 175/341 |
| 4,984,643 | A * | 1/1991 | Isbell et al. | 175/341 |
| 5,311,958 | A | 5/1994 | Isbell et al. | |
| 6,374,930 | B1 * | 4/2002 | Singh et al. | 175/374 |
| 2004/0243367 | A1 | 12/2004 | McDonough et al. | |
| 2005/0096847 | A1 * | 5/2005 | Huang | 702/9 |
| 2005/0167161 | A1 | 8/2005 | Aaron et al. | |
| 2006/0006003 | A1 | 1/2006 | Singh et al. | |

FOREIGN PATENT DOCUMENTS

GB 2020715 A 11/1979

* cited by examiner

*Primary Examiner* — David J Bagnell
*Assistant Examiner* — Cathleen R Hutchins
(74) *Attorney, Agent, or Firm* — Bracewell & Giuliani LLP

(57) ABSTRACT

An earth boring bit has cutting elements arranged to avoid tracking. The bit has a bit body having a bit axis of rotation. First, second and third cones are rotatably mounted to the bit body, each of the cones having a plurality of rows of cutting elements including a heel row and an adjacent row. The heel row of the first cone has at least equal the number of cutting elements as the heel rows of the other cones. The adjacent row of the second cone has at least 90 percent as many cutting elements as the heel row of the first cone. The heel row of the third cone has a pitch that is in the range from 20-50% greater than the heel rows of the first cone.

18 Claims, 2 Drawing Sheets

CUTTING STRUCTURE FOR EARTH-BORING BIT TO REDUCE TRACKING

Matter enclosed in heavy brackets [ ] appears in the original patent but forms no part of this reissue specification; matter printed in italics indicates the additions made by reissue.

CROSS-REFERENCE TO RELATED APPLICATION

This claims priority to provisional application 60/808,874, filed May 26, 2007.

FIELD OF THE INVENTION

This invention relates in general to earth-boring bits, and in particular to rotating cone bits with cutting elements that are arranged to reduce tracking.

BACKGROUND OF THE INVENTION

A roller cone earth-boring drill bit has a number of cones, typically three, each mounted rotatably to a bearing pin. Each cone rotates about its axis when the bit body rotates around the bit axis. The cones have rows of cutting elements, which may be teeth integrally formed in the cone metal, or tungsten carbide inserts pressed into mating holes in the cone metal.

Each cone will have an outermost or heel row near a gage surface of the cone and one or more inner rows. One or more of the cones will have cutting elements located near or on the nose of the cone. In some cases the inserts in the adjacent row closest to the heel row will be staggered or alternate with the inserts in the heel row.

The inner rows of each cone are arranged at different distances from the bit axis for cutting different portions of the borehole bottom. Normally, at least two of the cones will have heel rows that are located at substantially the same distance from the bit axis. Some of the adjacent rows may be approximately the same distance from the bit axis. When all three cones are rotated into a single section plane, these heel row inserts and some of the adjacent row inserts will superimpose or overlap at least partially on one another. The inner rows are normally spaced at different distances from the bit axis to cover the remaining portions of the borehole bottom.

When rows of inserts of different cones overlap each other, tracking can result. That is the inserts of the two or more cones in those rows tend to fall into the same holes in the borehole bottom, building up ridges on the bottom. These ridges are detrimental because they can contact the supporting metal of the cone, lower the load on the inserts, and cause wear.

In the prior art, steps are taken to reduce tracking. Usually, a bit designer tries to provide at least one of the heel rows with the maximum number of inserts because these rows engage more of the borehole bottom than any other rows. The maximum number is limited by the requirement of adequate supporting metal in the cone body. A typical approach to further reduce tracking is to increase the pitch in the overlapping heel row of another cone. The wider pitch, or distance between center lines of inserts, tends to break up the ridges that form between the impressions made by the more closely spaced heel row inserts. In addition, the adjacent row inserts are staggered with the wider pitch heel row. While workable, a greater pitch means fewer inserts in the adjacent row. This reduces the durability of the adjacent row and can result in even higher ridge build-up between the adjacent row inserts.

SUMMARY

The earth boring bit of this invention has first, second and third cones rotatably mounted to the bit body. Each of the cones has a plurality of rows of cutting elements, including a heel row and an adjacent row The heel row of the first cone has at least equal the number of cutting elements as the heel rows of the other cones. The adjacent row of the second cone has at least 90 percent as many cutting elements as the heel row of the first cone. The heel row of the third cone has a pitch that is in the range from 20-50% greater than the heel row of the first cone to reduce tracking.

In the preferred embodiment, the pitches of the heel rows of the first and second cones are substantially the same. In one embodiment, the heel row and the adjacent row of the third cone are staggered relative to each other such that an outermost portion of the cutting elements of the adjacent row of the third cone is substantially as far from the bit axis as an innermost portion of the cutting elements of the heel row. The heel and adjacent rows of the second cone may also be staggered. Preferably the cutting elements of the adjacent row of the second cone protrude from supporting metal of the second cone substantially the same amount as the heel row of the first cone.

In the embodiment shown, the cutting elements comprise tungsten carbide inserts, each having a barrel that is pressed into a hole in the cone metal. Each of the first cone adjacent row cutting elements has a barrel diameter at least equal to the barrel diameter of the first cone heel row cutting elements. Preferably, the barrel diameters of the adjacent row cutting elements of all of the cones are at least equal to all of the heel row cutting elements.

DETAILED DESCRIPTION OF THE INVENTION

Figure 1:
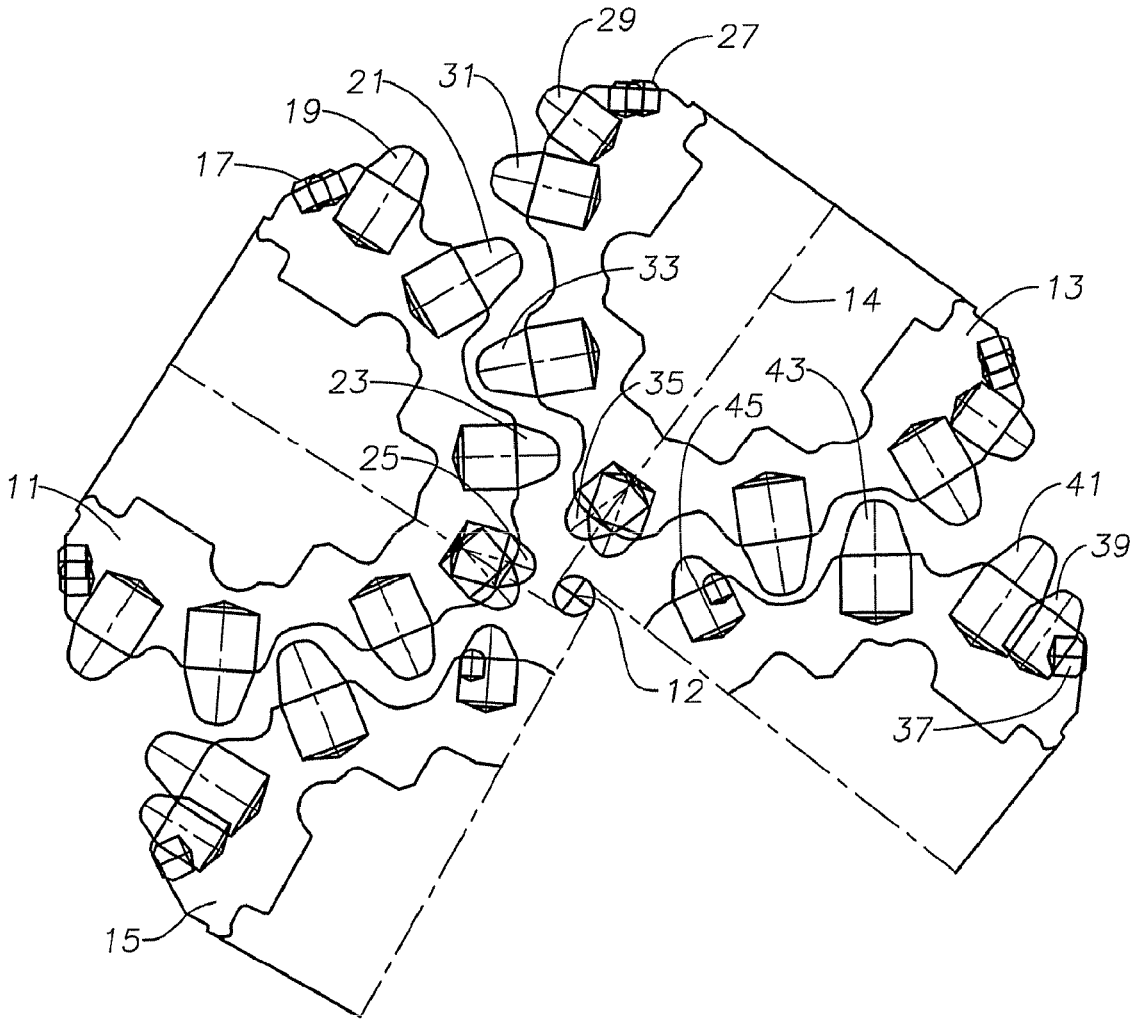
FIG. 1 is a diagram of an earth-boring bit constructed in accordance with this invention illustrating the intermeshing relationship of the cutting elements of the cone.

Referring to FIG. 1, the earth-boring bit in this embodiment has three cones 11, 13 and 15. Third cone 15 is shown in the drawing split into two parts as is customary with this type of drawing, but actually comprises a single-piece cone like first and second cones 11, 13. The designations "first", "second" and "third" as applied to cones 11, 13 and 15 are arbitrary and not used in a limiting manner. For example, for the purposes herein cone 15 could just as easily be considered the first cone. Each cone 11, 13 and 15 is rotatably mounted on a bearing pin (not shown) depending from the body of the bit. When the bit rotates around bit axis 12, each cone 11, 13 and 15 rotates about its cone axis 14.

Figure 2:
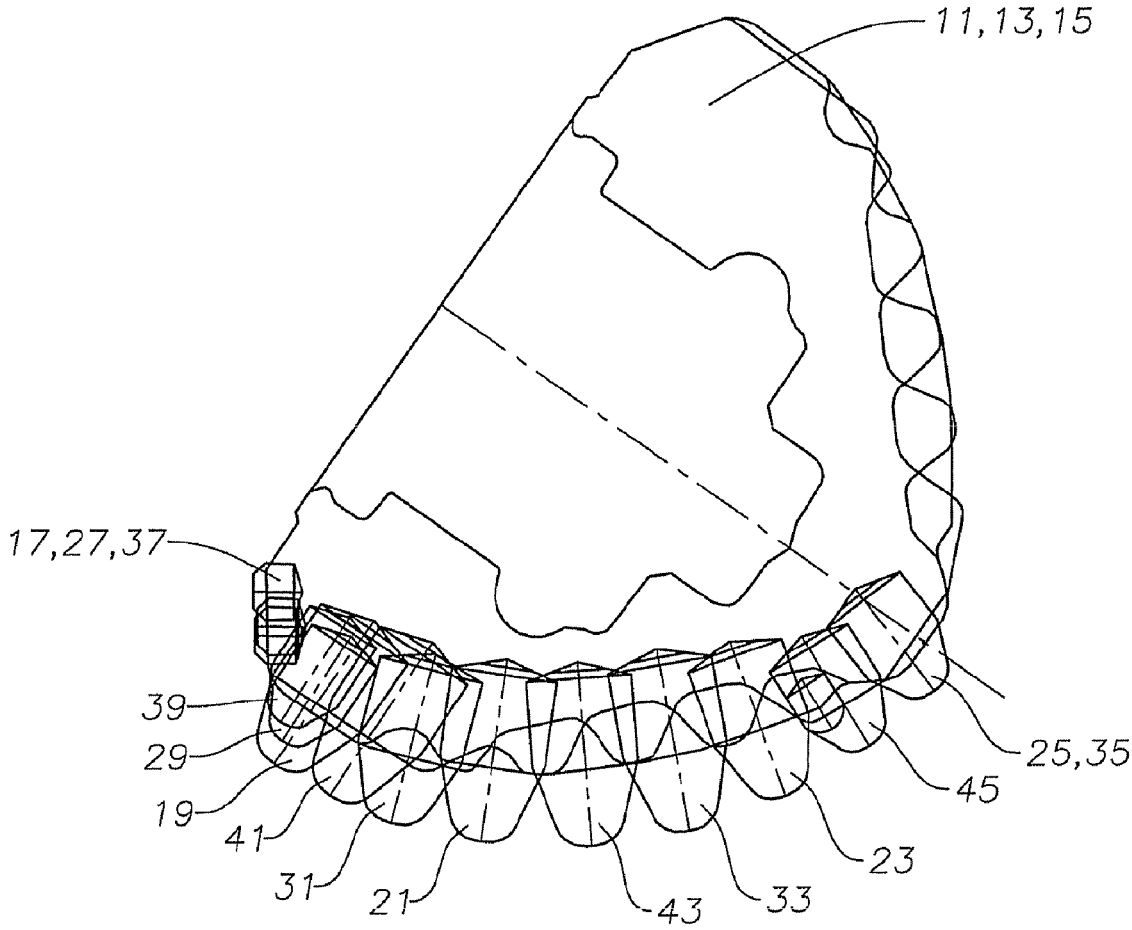
FIG. 2 is a diagram of the earth-boring bit of FIG. 1, with each cone rotated into the same plane to illustrate bottom hole coverage of the bit.

Cones 11, 13 and 15 have a plurality of rows of cutting elements, which in this example comprise tungsten carbide inserts pressed into holes drilled in the metal of the cone body. Alternately, the cutting elements could comprise teeth machined in the exterior of the cone body. In the example of FIG. 1, first cone 11 has two rows of gage inserts 17 located on the gage surface for engaging the side wall of the bore being drilled. The two rows of gage inserts 17 are staggered relative to one another so that they appear partially superimposed when rotated into the same plane, as shown in FIG. 2, although this may be varied. Gage inserts 17 have flat outer ends for resisting abrasion of the gage surface of each cone 11, 13 and 15.

First cone 11 also has a plurality of heel row inserts 19, which are located in a heel area adjoining the gage surface. One of the cones 11, 13, 15 will be provided with the maximum number of heel row inserts, which in this example, comprises heel row 19 of first cone 11. Heel row inserts 19 must have adequate supporting metal of the cone body between each insert 19. The supporting metal and the diameter of the barrel of each insert 19 determine the number of heel row inserts 19 that can be mounted on first cone 11. In this example, there are seventeen heel row inserts 19, but that number can vary.

First cone 11 has an adjacent row 21 of inserts, which is the closest row to the inserts of heel row 19. In this example, each portion of each adjacent row insert 21 is closer to bit axis 12 than any portion of heel row inserts 19. That is, they do not superimpose or overlap each other when rotated into a single sectional plane, as shown in FIG. 2. The number of adjacent row inserts 21 is also selected to be of the maximum level possible, but because of the smaller circumference of the body of cone 11 at that point than at heel row 19, there are only thirteen adjacent row inserts 21. Adjacent row inserts 21 may be of the same diameter and have the same cutting end protrusion as heel row inserts 19, if desired; however, in this example, adjacent row inserts 21 have slightly greater protrusions and diameters than heel row inserts 19. First cone 11 also has an inner row of inserts 23 that are spaced considerably closer to bit axis 12 than adjacent row inserts 21. In addition, first cone 11 has one or more nose inserts 25 located at the blunted apex of the body of first cone 11.

Like first cone 11, second cone 13 has two rows of gage inserts 27 that are staggered, but that arrangement could vary. Second cone 13 has a plurality of heel row inserts 29 and a plurality of adjacent row inserts 31. In this invention, since first cone 11 was selected to have the maximum number of heel row inserts, either second cone 13 or third cone 15 will be selected to have an adjacent row of inserts with 90% or more of the same number of inserts as first cone heel row 19. In this example, second cone 13 has that row of adjacent inserts 31. Also, second cone adjacent row inserts 31 may have the same diameter and cutting end protrusion as first cone heel row inserts 19.

Adjacent row 31 of second cone 13 is spaced much closer to its heel row 29 than adjacent row 21 is spaced to its heel row 19 of first cone 11. Preferably, second cone heel row inserts 29 and adjacent row inserts 31 are staggered relative to each other, with each adjacent row insert 31 being circumferentially between and farther inward than two of the heel row inserts 29. When rotated into a single plane as shown in FIG. 2, the inner lower corner of heel row inserts 29 is spaced about the same distance from bit axis 12 as the outer lower portion of adjacent row inserts 31. The number of adjacent row inserts 31 in second cone 13 is sixteen, which being 94.1% of seventeen, is in the range from 90% or more of the number of heel row inserts 19 in first cone 11. Adjacent row inserts 31 preferably have approximately the same diameter and cutting end protrusion as heel row inserts 19 of first cone 11.

In order to provide adequate support metal for the large number of adjacent row inserts 31, in addition to the staggering, the size of heel row inserts 29 is considerably less than the size of adjacent row inserts 31. The diameters as well as the cutting ends of heel row inserts 29 are less than the diameter and cutting end protrusion of adjacent row inserts 31. Because second cone heel row inserts 29 and adjacent row inserts 31 are staggered, they normally have equal numbers. Second cone 13 also has inner row inserts 33 and one or more nose inserts 35. Inner row inserts 33 are located between adjacent row inserts 21 and inner row inserts 23 of first cone 11.

Third cone 15 has gage surface inserts 37, which in this example, are located in a single row. In addition, third cone 15 is configured to reduce tracking occurring between first cone heel row inserts 19, second cone heel row inserts 29 and third cone heel row inserts 39. The heel rows 19, 29 and 39 are all at the same distance from bit axis 12 in this embodiment. The number of first cone heel row inserts 19 and second cone heel row inserts 29 is either the same or within 90% of the same as mentioned, thus tracking could occur. To reduce tracking, third cone heel row 39 is provided with a substantially different pitch or distance between axes of inserts than the pitches of first cone heel row inserts 19 and second cone heel row inserts 29. The pitches in heel rows 19 and 29 do not differ significantly, and the pitch in first cone heel row 19 is a minimum amount possible, given the diameter and size of heel row inserts 19. Consequently, the pitch in third cone heel row 39 is made considerably larger, preferably 20 to 50% greater. First cone heel row 19 has at least equal the number of cutting elements as the heel rows 29, 39 of the other cones. In this example, there are only fourteen heel row inserts 39, versus seventeen heel row inserts 19 and sixteen heel row inserts 29. Stated another way, there are at least 20 to 50% more inserts in first cone heel row 19 than in third cone heel row 39. In this example, the difference is three divided by fourteen, which is 21.5% more.

In this example, third cone 15 has adjacent row inserts 41 that are staggered with heel row inserts 39 to enhance durability. The innermost portion of each heel row insert 39 is closer to bit axis 12 than the outermost portion of each adjacent row insert 41, creating an overlapping portion as shown in FIG. 2. The number of adjacent row inserts 41 is the same as heel row inserts 39 because they are staggered. To provide adequate support metal, in this embodiment, heel row inserts 39 are smaller both in protrusion and barrel diameter than adjacent row inserts 41. In the preferred embodiment, third cone heel row inserts 39 are smaller even than second cone heel row inserts 29, although this could be varied. For example, one could increase the diameter of the inserts of heel row 39 and proportionally reduce the size of adjacent row inserts 41.

Adjacent row inserts 41 may have the same diameter and cutting end protrusion as second cone adjacent row inserts 31 and first cone adjacent row inserts 21, and thus, they will also have a pitch that is 20-50% greater than between adjacent row inserts 31 of second cone 13. As shown in FIG. 2, adjacent row inserts 41 and 31 overlap each other substantially but do not overlap a significant degree with adjacent row 21 of first cone 11. Third cone adjacent row inserts 41 are spaced farther from bit axis 12 than second cone adjacent row inserts 31 and first cone adjacent row inserts 21. Third cone 15 also has inner row inserts 43 and one or more nose area inserts 45. Inner row inserts 43 are spaced between adjacent row 31 and inner row 33 of second cone 13.

When designing the cutting structure in accordance with this invention, the designer first selects one of the cones 11, 13, 15 to have a maximum number of heel row inserts given a desired protrusion and barrel diameter. In this embodiment, as mentioned, first cone 11 has the maximum number of heel row inserts in its heel row 19. The designer then selects another cone to have adjacent row inserts that are the same size and have at least 90% as many inserts as the maximum heel row 19. In this example, second cone 13 was provided with only one less adjacent row insert 31 than first cone heel row inserts 19. The designer then staggers heel row 29 on second cone 13 with adjacent row inserts 31. In order to provide supporting metal, heel row inserts 29 may be of smaller diameter and may have smaller cutting end protrusion than adjacent row inserts 31.

The designer then designs the third cone to break up tracking in the heel rows of the other cones. The designer does this by use of a third cone heel row 39 having a pitch 20-50% greater than the pitches of first cone heel row 19. In this example, heel row 39 has 21.4% fewer inserts than first cone heel row 19. Adjacent row 41 is staggered with heel row inserts 39, and therefore has also a greater pitch than adjacent row 31, thus breaking up tracking in the adjacent rows 31, 41.

The invention has significant advantages. Increasing the pitch in one of the heel rows resists tracking in the heel row and in one of the adjacent rows resists tracking in the adjacent rows. Providing at least 90 percent as many adjacent row cutting elements as the maximum number in the heel row provides durability for the adjacent row and resists ridge buildup.

While the invention has been shown in only one of its forms, it should be apparent to those skilled in the art that it is not so limited but is susceptible to various changes without departing from the scope of the invention. For example, although only cones with tungsten carbide inserts as cutting elements are shown, the cones could have cutting elements that comprise teeth machined from the body of the cone.

The invention claimed is:

1. An earth boring bit, comprising:

a bit body having a bit axis of rotation;

first, second and third cones rotatably mounted to the bit body, each of the cones having a plurality of rows of cutting elements, each of the cutting elements comprising an insert having a barrel pressed into a mating hole in one of the cones, the rows of cutting elements including a heel row and an adjacent row;

the heel row of the first cone having at least equal the number of cutting elements as the heel row of the second cone and 20-50% more cutting elements than the heel row of the third cone; [and]

the adjacent row of the second cone having at least 90 percent as many cutting elements as the heel row of the first cone[.];

*wherein the heel row and the adjacent row of the second cone are staggered relative to each other such that an outermost portion of the barrel of each of the cutting elements of the adjacent row of the second cone is substantially as far from the bit axis as an innermost portion of the barrel of each of the cutting elements of the heel row of the second cone; and*

*wherein the heel row and the adjacent row of the third cone are staggered relative to each other such that an outermost portion of the barrel of each of the cutting elements of the adjacent row of the third cone is substantially as far from the bit axis as an innermost portion of the barrel each of the cutting elements of the heel row of the third cone.*

2. The bit according to claim 1, wherein the number of cutting elements of the heel row of the first cone is substantially the same as the number of cutting elements of the heel row of the second cone.

[3. The bit according to claim 1, wherein the heel row and the adjacent row of the second cone are staggered relative to each other such that an outermost portion of the barrel of each of the cutting elements of the adjacent row of the second cone is substantially as far from the bit axis as an innermost portion of the barrel of each of the cutting elements of the heel row of the second cone.]

[4. The bit according to claim 1, wherein the heel row and the adjacent row of the third cone are staggered relative to each other such that an outermost portion of the barrel of each of the cutting elements of the adjacent row of the third cone is substantially as far from the bit axis as an innermost portion of the barrel each of the cutting elements of the heel row of the third cone.]

5. The bit according to claim 1, wherein the cutting elements of the adjacent row of the second cone protrude from supporting metal of the second cone substantially as much as the adjacent rows of the first and third cones.

6. The bit according to claim 1, wherein the cutting elements of the adjacent row of the first cone protrude from supporting metal of the first cone more than the amount the heel row of the first cone protrudes.

7. An earth boring bit, comprising:

a bit body having a bit axis of rotation;

first, second and third cones rotatably mounted to the bit body, each of the cones having a plurality of rows of cutting elements, each being an insert having a barrel pressed into a mating hole in supporting metal of the cone, each of the cones having a heel row and an adjacent row of cutting elements, the heel rows of the cones being located substantially the same distance from the bit axis;

the heel row of the first cone having at least equal the number of cutting elements as the heel row of the second cone and 20-50% more cutting elements that the heel row of the third cone;

the adjacent row of the second cone having at least 90 percent as many cutting elements as the heel row of the first cone, each of the cutting elements of the adjacent row of the second cone having a barrel diameter that is substantially the same as a barrel diameter of each of the cutting elements of the heel row of the first cone; and the adjacent row of the third cone being staggered with the heel row of the third cone, such that an outermost portion of the barrel of each of the cutting elements of the adjacent row of the third cone is at least as far from the bit axis as an innermost portion of the barrel of each of the cutting elements of the heel row of the third cone.

8. The bit according to claim 7, wherein each of the cutting elements of the adjacent row of the first cone has a barrel diameter at least equal to the barrel diameter of the cutting elements of the heel row of the first cone.

9. The bit according to claim 7, wherein each of the cutting elements of the adjacent row of the first cone has a barrel diameter greater than the barrel diameter of the cutting elements of the heel row of the first cone.

10. The bit according to claim 7, wherein the barrel diameter of each of the cutting elements of the heel row of the first cone is at least equal to the barrel diameter of each of the cutting elements of the heel row of the second cone.

11. The bit according to claim 7, wherein the barrel diameter of each of the cutting elements of the heel row of the first cone is at least equal to the barrel diameter of each of the cutting elements of the heel row of the third cone.

12. The bit according to claim 7, wherein a barrel diameter of each of the cutting elements of the adjacent row of each of the cones is at least equal to a barrel diameter of each of the cutting elements of the heel row on the same cone.

13. The bit according to claim 7, wherein each of the cutting elements of the adjacent row of each of the cones protrudes from the supporting metal at least as far as each of the cutting elements of the heel row of the same cone.

14. An earth boring bit, comprising:

a bit body having a bit axis of rotation;

first, second and third cones rotatably mounted to the bit body, each of the cones having a heel row, an adjacent row, and an inner row of cutting elements, each of the cutting elements being an insert having a barrel pressed into a mating hole in support metal of the cone;

the first cone heel row having at least equal the number of cutting elements as the second cone heel row and 20-50% more cutting elements than the cutting elements of the third cone heel row;

the second cone adjacent row having at least 90 percent as many cutting elements as the first cone heel row;

the third cone adjacent row cutting elements being staggered with the third cone heel row cutting elements; and each of the cutting elements of the [adjacent] *heel* row [of each] of the second cone having a barrel diameter smaller than a barrel diameter of each of the adjacent row cutting elements of each of the other cones.

15. The bit according to claim 14, wherein the second cone heel row has substantially the same number of cutting elements as the first cone heel row.

16. The bit according to claim 14, wherein each of the adjacent row cutting elements of each of cones protrudes from the supporting metal of its cone at least as far as each of the heel row cutting elements of the heel row of the each of the cones.

17. The bit according to claim 14, wherein a distance between the first cone heel row and adjacent row is greater than a distance between the second cone heel row and adjacent row and between the third cone heel row and adjacent row.

18. The bit according to claim 14, wherein the second cone adjacent row and heel row are staggered such that an outermost portion of the barrel of each of the cutting elements of the second cone adjacent row is at least as far from the bit axis as an innermost portion of the barrel of each of the cutting elements of the third cone heel row.

19. The bit according to claim 14, wherein the number of cutting elements in the third cone adjacent row is less than the number of cutting elements in the second cone adjacent row.

20. The bit according to claim 14, wherein the cutting elements of the second cone adjacent row protrude from supporting metal of the second cone substantially as much as the cutting elements of the adjacent rows of the first and second cones.

* * * * *